US007961346B1

(12) United States Patent
Markovic et al.

(10) Patent No.: US 7,961,346 B1
(45) Date of Patent: Jun. 14, 2011

(54) COMPLEXITY-BASED TRANSPARENCY FLATTENING

(75) Inventors: Dejan Markovic, Menlo Park, CA (US); Krish Chaudhury, Milpitas, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 12/911,017

(22) Filed: Oct. 25, 2010

Related U.S. Application Data (60) Continuation of application No. 12/132,526, filed on Jun. 3, 2008, now Pat. No. 7,821,668, and a division of application No. 11/737,964, filed on Apr. 20, 2007, now Pat. No. 7,385,727, which is a continuation of application No. 10/153,426, filed on May 21, 2002, now Pat. No. 7,209,258.

(51) Int. Cl.
*G06K 15/00* (2006.01)
*G06F 3/12* (2006.01)

(52) U.S. Cl. ...... 358/1.18; 358/1.1; 358/1.13; 358/1.16; 358/1.17

(58) Field of Classification Search ............... 358/1.1, 358/1.2, 1.6, 1.9, 1.11, 1.13, 1.12, 1.15, 1.16, 358/1.17, 1.18, 1.3, 1.4, 1.5, 1.7, 1.8, 2.1, 358/2.99, 3.01, 3.22, 3.23, 3.24, 3.26, 3.27, 358/426.05, 426.06, 1.14, 450, 453, 462, 358/538, 540; 399/40, 2, 160, 178, 183; 382/164, 165, 170, 171, 172, 173, 176, 177, 382/178, 179, 180, 181, 221; 715/200, 204, 715/273, 274, 276, 246, 255; 345/619, 620, 345/621, 622, 623, 624, 428, 588, 589, 590, 581, 592, 422, 423, 426, 629, 630

See application file for complete search history.

(56) References Cited

U.S. PATENT DOCUMENTS

| 5,555,352 | A |   | 9/1996 | Lucas |        |
|-----------|---|---|--------|-------|--------|
| 5,638,498 | A | * | 6/1997 | Tyler et al. | 358/1.18 |
| 5,745,121 | A |   | 4/1998 | Politis |      |
| 5,912,672 | A |   | 6/1999 | Liguori |      |

(Continued)

FOREIGN PATENT DOCUMENTS

EP   1 104 918 A2   6/2001

OTHER PUBLICATIONS

Nievergelt, J., and Preparata, F.P., "Plane-Sweep Algorithms for Intersecting Geometric Figures," *Commun. ACM*, 25(10):739-747 (1982).

*Primary Examiner* — Dov Popovici
(74) *Attorney, Agent, or Firm* — Fish & Richardson P.C.

(57) ABSTRACT

Methods, systems, and apparatus, including computer program products, for determining a complexity value for a subregion of an electronic document page that includes one or more objects. In one aspect, a method includes dividing a subregion of an electronic document page into a plurality of cells, where the electronic document page includes one or more objects, the objects include one or more transparent objects, the subregion includes at least part of a transparent object, and each cell has an associated cell counter. The method includes, for each object partly or completely located in the subregion, identifying cells that are overlapped by the object, and increasing the associated cell counter for each of the identified cells. The method includes summing all cell counters associated with all cells in the subregion to determine a complexity value for the subregion.

3 Claims, 7 Drawing Sheets

U.S. PATENT DOCUMENTS

| | | |
|---|---|---|
| 5,923,333 A | 7/1999 | Stroyan |
| 5,990,904 A | 11/1999 | Griffin |
| 6,020,897 A | 2/2000 | Carlsen et al. |
| 6,049,339 A | 4/2000 | Schiller et al. |
| 6,720,977 B1 | 4/2004 | Bourdev et al. |
| 7,181,687 B2 | 2/2007 | Bourdev |
| 7,209,258 B1 | 4/2007 | Markovic et al. |
| 7,385,727 B1 | 6/2008 | Markovic et al. |
| 2002/0130888 A1 | 9/2002 | Perry et al. |

* cited by examiner

COMPLEXITY-BASED TRANSPARENCY FLATTENING

CROSS-REFERENCE TO RELATED APPLICATION

This application is a continuation application and claims priority under 35 USC §120 to U.S. patent application Ser. No. 12/132,526, entitled COMPLEXITY-BASED TRANSPARENCY FLATTENING, which was filed on Jun. 3, 2008 (U.S. Pat. No. 7,821,668, to be issued Oct. 26, 2008), and is also a divisional application of, and claims priority to, U.S. patent application Ser. No. 11/737,964, entitled COMPLEXITY-BASED TRANSPARENCY FLATTENING, which was filed on Apr. 20, 2007, now issued as U.S. Pat. No. 7,385,727, which is a continuation application of, and claims priority to, U.S. patent application Ser. No. 10/153,426, entitled COMPLEXITY-BASED TRANSPARENCY FLATTENING, which was filed on May 21, 2002, now issued as U.S. Pat. No. 7,209,258. The disclosure of the above application is incorporated herein by reference in its entirety.

BACKGROUND

This invention relates to rendering of graphics objects in a computer graphics application.

A page in an electronic document can include various types of graphics objects, such as text, line arts, and images. Electronic documents can generally be viewed, created, and edited by a user on a computer using a computer graphics application. Most computer graphics applications can also be used to produce (directly or indirectly) printed output defined by the electronic document. When a user wishes to create a printed copy of the electronic document, the high-level description of each document page must be converted into a two-dimensional array of colored dots, also referred to as pixels, which can be directly printed by the printing device. This conversion process is commonly known as rendering. Examples of computer graphics applications include the Adobe® Illustrator® and Adobe® Photoshop® applications, both available from Adobe Systems Incorporated of San Jose, Calif.

A given page of an electronic document can include objects that are to some degree transparent, such that objects that are placed behind the transparent objects can be seen through the transparent objects. Since Postscript® printers have no notion of transparent objects, if one or more pages of an electronic document contain a combination of transparent and opaque graphics objects, the graphics objects must typically be broken up into non-intersecting opaque components, which can be printed on the printing device. The process in which the opaque components are created is known as flattening. For a number of reasons, flattening can be prohibitively expensive in terms of memory, even for transparent objects with a relatively simple shape.

Graphics objects with a simple shape can intersect one another in complex ways and generate a large number of opaque components. During the printing process, an artwork tree is typically created, which represents all of the objects to be printed on a single page. Each leaf in the artwork tree represents an individual object, and each non-leaf node in the artwork tree represents a transparency group. Since opaque components are not necessarily generated in the order in which they must be printed, the entire artwork tree (and the opaque components corresponding to the objects in the artwork tree) must be kept in the main memory of the printer throughout the rendering process. Optionally, the artwork tree could be saved to a hard disk or other non-volatile storage medium, but retrieving the information from this memory could make the time for printing the document page prohibitively long.

Furthermore, flatteners typically require that object boundaries be represented as polygons (that this, a sequence of straight lines) for efficient computation of object intersections. However, the polygonal approximation of objects having even moderately complex boundaries typically requires a large number of line segments, where each line segment is represented by at least four numbers describing the start and end coordinates for the straight line segment. Such polygonal representations of the boundaries of all objects in the artwork tree must also be kept in the memory of the printer. For complex curves, there may not be enough available memory space to keep all the polygonal representations in the memory of the printer. In addition, printers usually have a higher resolution than display devices, so polygonal representations of curves must be more precise to achieve a good printing quality, requiring an even larger number of polygons and raising the memory requirements of the printers further.

Last but not least, PostScript printers typically use different color schemes for rasterized images and graphic objects. Consequently, even if parts of the document page are rasterized in order to bypass the flattener and address the memory problems described above, the resulting output from the printer is often unsatisfactory.

SUMMARY

In general, in one aspect, this invention provides methods and apparatus, including computer program products, implementing and using techniques for rendering an electronic document page, the document page including one or more objects. It is determined whether any object of the one or more objects on the document page is a transparent object. If a transparent object is found, the document page is divided into a plurality of subregions. For each subregion, a set of one or more opaque object components is generated for any object having a location in the subregion. The document page is rendered, including separately rendering each of the plurality of subregions.

Advantageous implementations can include one or more of the following features. Dividing the document page can include dividing the document page based on a complexity condition. The complexity condition can be determined by a user. The complexity condition can be determined by an available amount of memory to be used when rendering a subregion. The complexity condition can be based on the number of objects having locations in the subregion, which can include objects and parts of objects that are located within a subregion.

Dividing the document page can include selecting a subregion of the document page, determining a complexity for the selected subregion of the document page, and if the complexity of the selected subregion satisfies (or does not satisfy) the complexity condition, dividing the selected subregion into a plurality of subregions based on the complexity of the selected subregion. Dividing the document page can include selecting a subregion of the document page, dividing the selected subregion into a plurality of subregions, determining a complexity for each of two or more subregions of the document page, and if the combined complexity of the two or more subregions satisfies the complexity condition, combining the two or more subregions into a larger subregion.

Generating a set of one or more opaque object components can include generating a set of one or more opaque object components for any object that is located partly or completely within the subregion. Rendering can include for each subregion, rendering the opaque components of the graphics objects to obtain an output representation of a part of the document page corresponding to the subregion. The transparent object can be a transparent graphics object. Rendering can include creating an artwork tree for each subregion. Each artwork tree can include one or more objects or one or more parts of objects that are located within the subregion. A leaf in an artwork tree can represent an object or a part of an object. A non-leaf node in an artwork tree can represent a group of objects that includes one or more transparent objects.

The subregions can all be of the same size, or one or more of the subregions can be different in size from the other subregions. The subregions can all have the same shape, or one or more of the subregions can have a different shape from the other subregions. In particular implementations, the subregions can be rectangular or square in shape.

Dividing the document page can be performed recursively until an optimal subregion size has been reached for each subregion of the document page containing a transparent object. The optimal subregion size can vary across the document page. The output representation of the one or more graphics objects or the one or more parts of graphics that are located within each subregion can be sent to a printer to generate a hardcopy of the document page.

In general, in another aspect, this invention provides methods and apparatus, including computer program products, implementing and using techniques for rendering an electronic document page, the document page including one or more objects. An electronic document page including one or more graphics objects is received. It is determined whether any object of the one or more graphics objects on the document page is a transparent graphics object. If a transparent object is found, a subregion of the document page is selected where the transparent graphics object is located, a complexity value is computed for the selected subregion, and if the complexity value for the selected subregion exceeds a complexity threshold value, the selected subregion is repeatedly divided into a plurality of subregions, including computing a new complexity value for each subregion, until each subregion has a complexity value that is lower than the threshold complexity value. The document page is rendered, including separately rendering each of the subregions.

The invention can be implemented to realize one or more of the following advantages. High quality rendering of transparent and opaque graphics objects in low memory printing devices can be achieved. Transparent and opaque graphics objects can be mapped to a set of opaque components, which can be rendered using standard graphics software. The memory requirements of the process are brought within reach of embedded Postscript printers, while the high output quality desirable in high-resolution printing devices can be maintained. Transparent objects that intersect one another in complex ways can be processed. Optimal performance can be achieved in printing transparent graphics objects under restricted memory conditions. Document pages containing one or more transparent graphics objects can be subdivided into variable sized regions, so that only one such subregion needs to be processed at a time, which allows flattening to take place under pre-specified memory limitations while maintaining optimal performance. Omitting the objects lying completely outside the subregion can reduce the size of the artwork tree for a given subregion. In case of graphics objects partially overlapping a given region, the graphics objects' boundaries can be clipped to the boundary of the given subregion, so that fewer opaque components are generated and the paths outlining the objects are smaller. Complexity estimations for unit portions of the page can be used to derive optimal subregion sizes that maximize performance without increasing peak memory consumption.

The details of one or more embodiments of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

The invention will now be described by way of example of how a single page in an electronic document is processed. The processing of a single page can easily be extended to processing of an entire document containing several pages.

Figure 1:
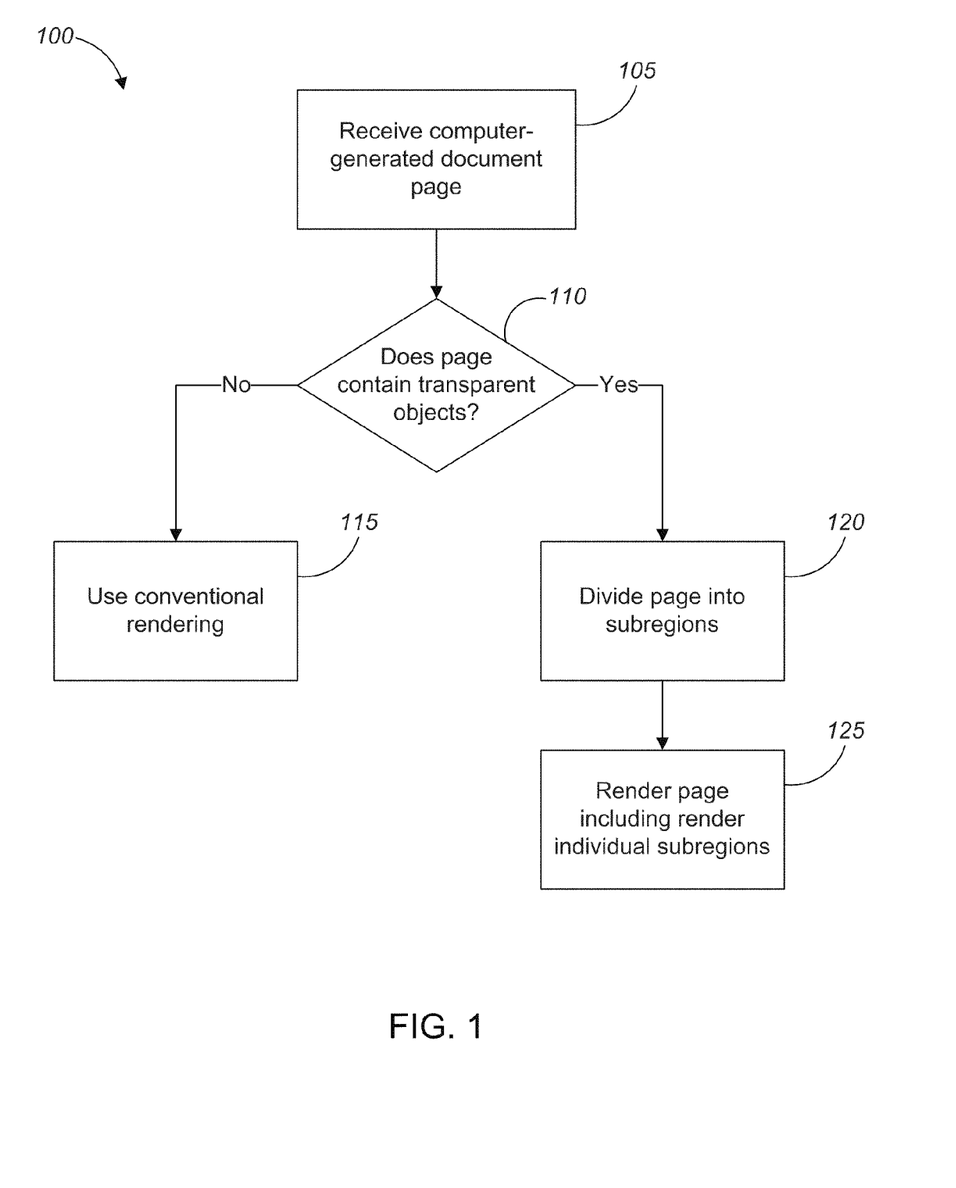
FIG. 1 is a flowchart showing a process for rendering an electronic document page.
Figure 6:
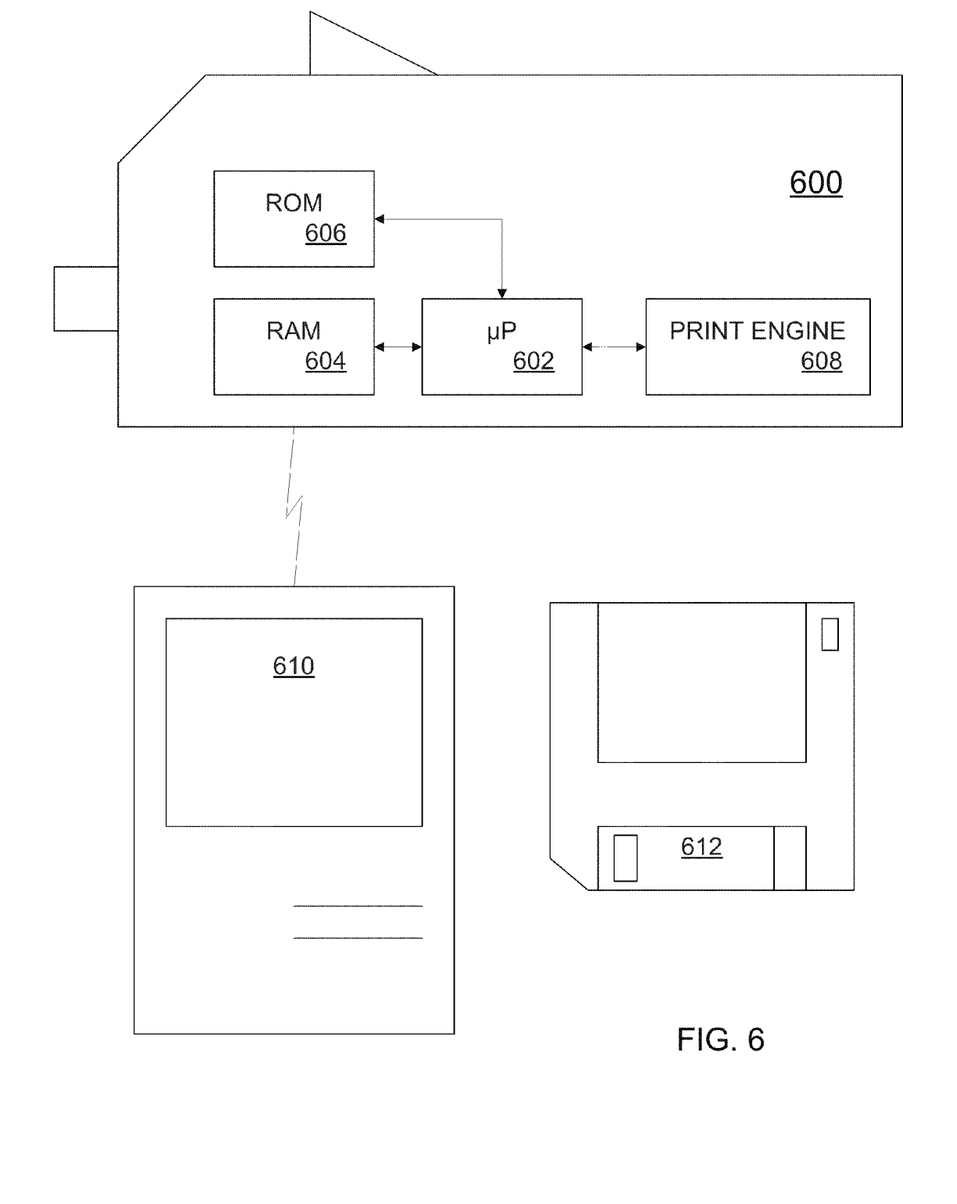
FIG. 6 shows a simplified drawing of a printing device in which the invention can be implemented.
Figure 7A:
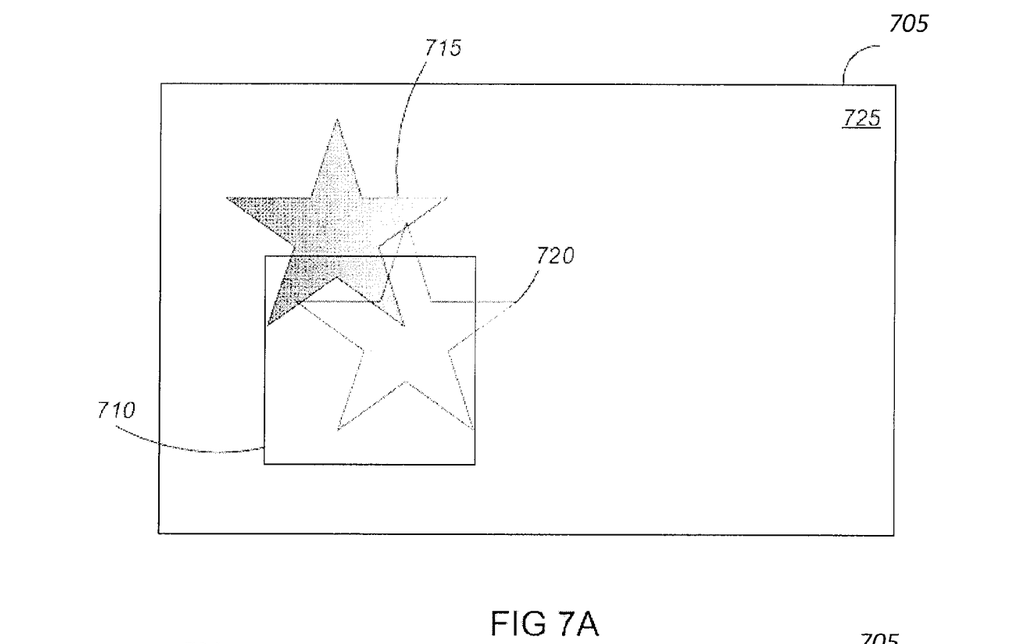
FIG. 7A shows an electronic document page having three objects.

As shown in FIG. 1, a process (100) for rendering an electronic document page starts by receiving an electronic document page that the user would like to output on a printing device (600), such as a Postscript printer (step 105). The document page can be created by a user in a computer graphics software application, such as Adobe Illustrator or Adobe Photoshop and can contain a combination of transparent and opaque objects, including text, images, filled or outlined geometric shapes, and so on. The objects in the document page can have a single color, or can be more complex, for example, being shaded or having a gradient. An exemplary electronic document page (705) can be seen in FIG. 7A. The document page (705) contains three objects. An opaque square (710) is partly covered by a semitransparent star (715) and a fully transparent star (720).

The process examines if the received page contains any transparent objects (step 110). If there are no transparent objects on the document page, it is unlikely that there will be any memory problems during the printing process, and the process continues to render the document using conventional rendering (step 115). However, if there are any transparent objects on the page, the process divides the page into subregions (step 120) and the rendering process is modified to render the individual subregions of the page one at a time (step 125) rather than rendering the entire page in a single step. The processing of an electronic document page containing one or more transparent graphics object will now be described in further detail with reference to FIGS. 2 and 3. One example of subregions is rectangular tiles, but the subregions can have virtually any shape.

Figure 2:
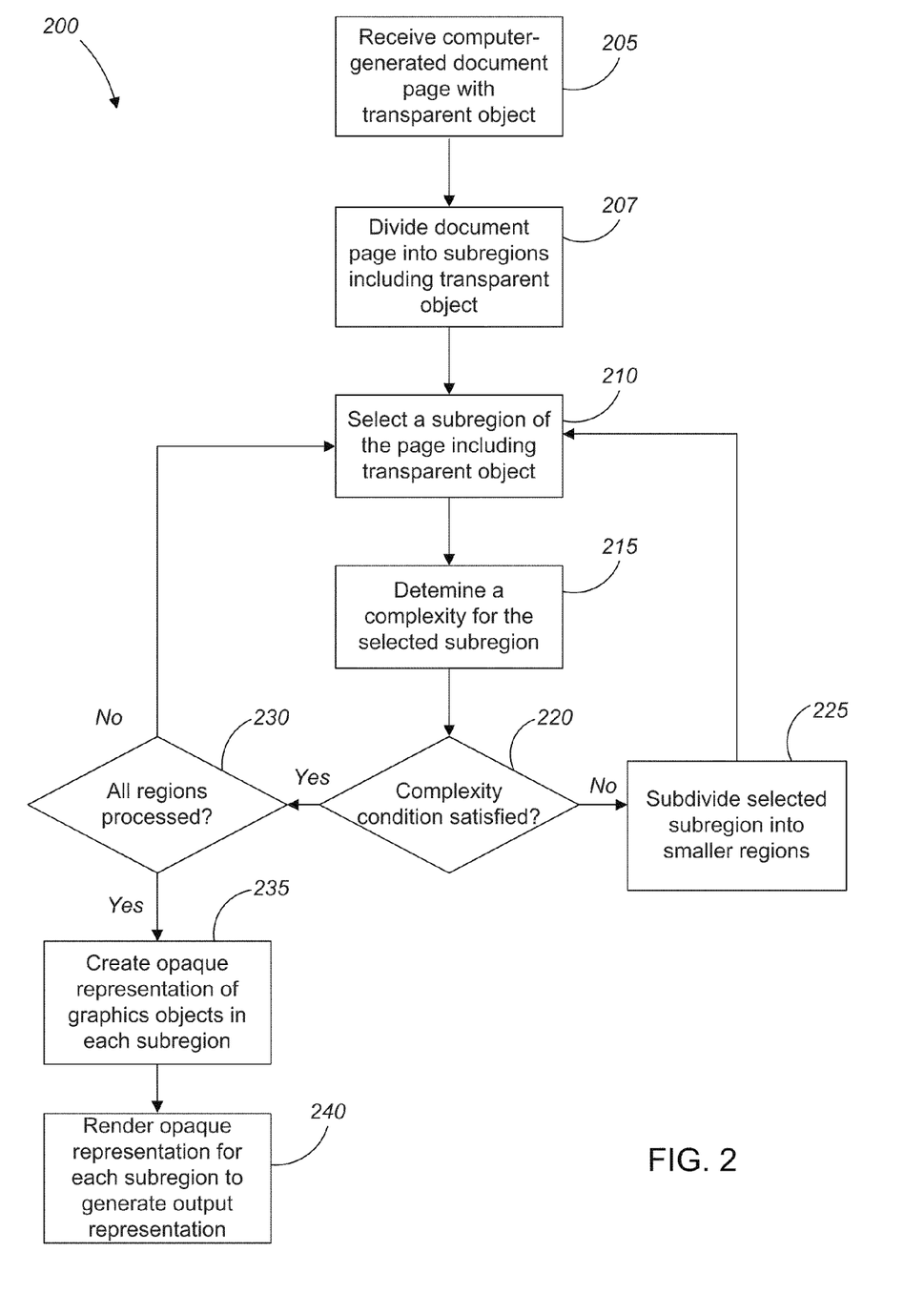
FIG. 2 is a flowchart showing one implementation of a process for rendering an electronic document page with one or more transparent objects.
Figure 7B:
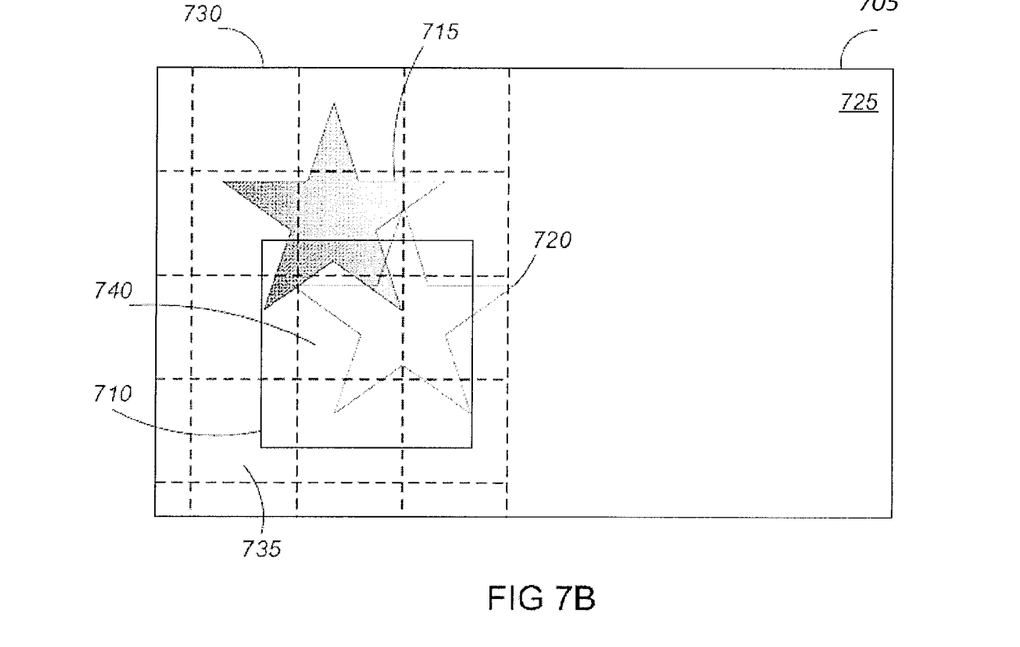
FIG. 7B shows the electronic document page of FIG. 5 divided into multiple subregions.

As shown in FIG. 2, in one implementation of the invention, an electronic document page containing at least one transparent object is received (step 205). The subregion of the document page where the transparent object or objects are located is then identified and selected (step 210). In FIG. 7B, the rightmost half (725) of the document page (705) does not contain any transparent objects, so the leftmost half (730) is selected. In one implementation, the subregion of the document page is first selected to be the entire page, while in other implementations a smaller subregion of the page can be selected, where the smaller subregion is sufficiently large to encompass all the transparent objects.

A complexity is determined for the selected subregion (step 215). The complexity provides the process (200) with information about how complex the selected subregion of the document page is, and is therefore also an indirect measure of how much printer memory will be required when the selected subregion is rendered. In one implementation, the complexity of the selected subregion is determined by calculating a complexity value for the subregion. A process for determining such a complexity value will now be described in further detail with reference to FIG. 4.

Figure 4:
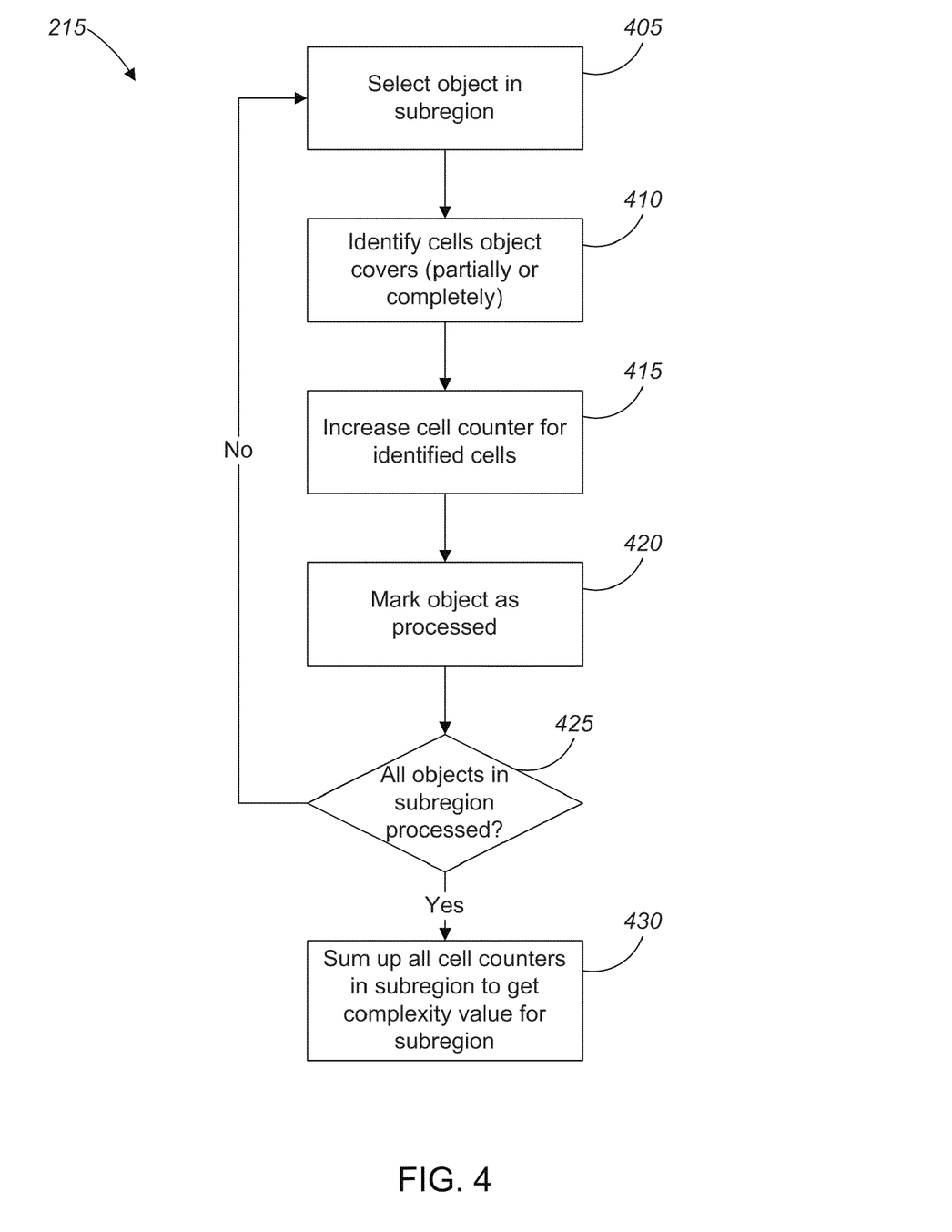
FIG. 4 is a flowchart showing a process for computing a complexity value for a subregion of an electronic document page.

In many ways, the computation of a complexity value can be similar to a conventional rendering process in which the document page is rendered at very low resolution. The complexity value is determined by investigating how many objects, and what type of objects, are located within the selected subregion of the page (which can include, e.g., objects that are completely within the selected region or objects that are only partly located within the region). One way of determining a complexity value for a subregion is shown in FIG. 4, where the subregion is broken up into a grid of cells, each cell having an associated cell counter. A cell is a small area of the document page and can, for example, be chosen to correspond to an area of 0.5 by 0.5 inches on the document page. Smaller cells can also be used, but this can lead to unacceptably long processing time. For the purposes of computing a complexity value for a selected subregion, an unmarked cell refers to a cell that has not yet been examined by the process with regards to computing a complexity value.

An object in the subregion is selected (step 405). For each object, the process identifies the cells that the object overlaps (partially or completely) (step 410). For each of these cells, the process increments the counter value by one (step 415). Thus, if there is a single opaque object overlapping a cell, the final counter value for the cell is one (see for example cell 735 of FIG. 7B). If the cell is overlapped by two transparent objects lying over a single opaque object, the final counter value for the cell is three (see for example cell 740 of FIG. 7B), and so on.

In different implementations, the process may determine not only how many objects are associated with the selected cell, but also the type of those objects. This information can then be used in assigning various weights to the objects when computing the complexity value, so that for example a transparent shaded object, such as the star 715 in FIG. 7B, which is considered to be a complex object, increments the complexity counter value more than an opaque plain colored object, such as the square 710 in FIG. 7B, which is considered to be a simple object.

When the process determines the types of objects as well as the number of objects, the cell counter can be incremented by more than one unit per object, depending on the weight of the object. In one implementation, the rules for how to weigh the different objects can be determined and customized by a user.

When all the cells covered by one object have been processed, the object is marked as processed (step 420). The process then checks whether all the objects lying partially or completely within the current subregion have been processed (step 425). If not, the process returns to step 405, where another unprocessed object is selected and steps 410 to 425 are repeated until all objects located partially or completely in the subregion have been processed.

The process then sums up all the values for the cell counters associated with the cells within the selected subregion to obtain a final complexity value for the entire subregion (step 430), which completes the calculation of the complexity value for the selected subregion.

Returning now to FIG. 2, the process then determines whether the complexity for the selected subregion satisfies a complexity condition (step 220). The complexity condition can be a value selected by a user, but is typically obtained automatically by querying the printing device about the amount of memory available for rendering the objects in the selected subregion of the document.

If the complexity condition is not satisfied, for example, if the value for the selected subregion exceeds the threshold complexity value, the selected subregion is subdivided into a number of smaller regions (step 225). The number of smaller regions or subregions can be selected by the user to ensure optimal processing. Alternatively, the number of subregions can be automatically selected by the process, and can be a predetermined number or a variable number depending on the magnitude of the difference between the threshold complexity value and the computed complexity value for the selected subregion. The process then returns to step 210, where one of the new subregions is selected and a complexity is determined as described above. It should be noted that in an alternative implementation to the one described above in FIG. 4, the entire page can be divided into cells, and values of all the cell counters for the entire page can be computed at once and kept in main memory of the device carrying out the division of a region into subregions. Then, rather than going through all the steps described in FIG. 4 for each subregion, the complexity value for a subregion can be computed by identifying the cells lying within that subregion, retrieving the corresponding cell counter values from memory and summing them up. This can provide substantial time savings during the complexity determination for a subregion.

If the complexity condition for the selected subregion is satisfied, the process examines whether all the regions (including the subregions) of the document page have been processed (step 230)—that is, whether a complexity has been determined for each subregion on the document page and the complexity condition for each of these regions is satisfied. If all regions have not been processed, the process returns to step 210, where a new subregion is selected and a complexity value is computed as described above.

If it is determined in step 230 that all the regions of the document page have been processed, an opaque representation is created for the graphics objects in each subregion (step 235)—that is, a set of opaque object components is generated for any object that is located entirely or partly within the subregion. The size and shape of each opaque object component is determined by the intersections of the graphics objects within the subregion. This process is known as flattening and can be carried out using a number of conventional methods. One such process is described in "Plane-Sweep Algorithm for Intersecting Geometric Figures," J. Nievergelt, F. P. Preparata, Communications of the ACM, October 1982, Vol. 25, No. 10.

Figure 5:
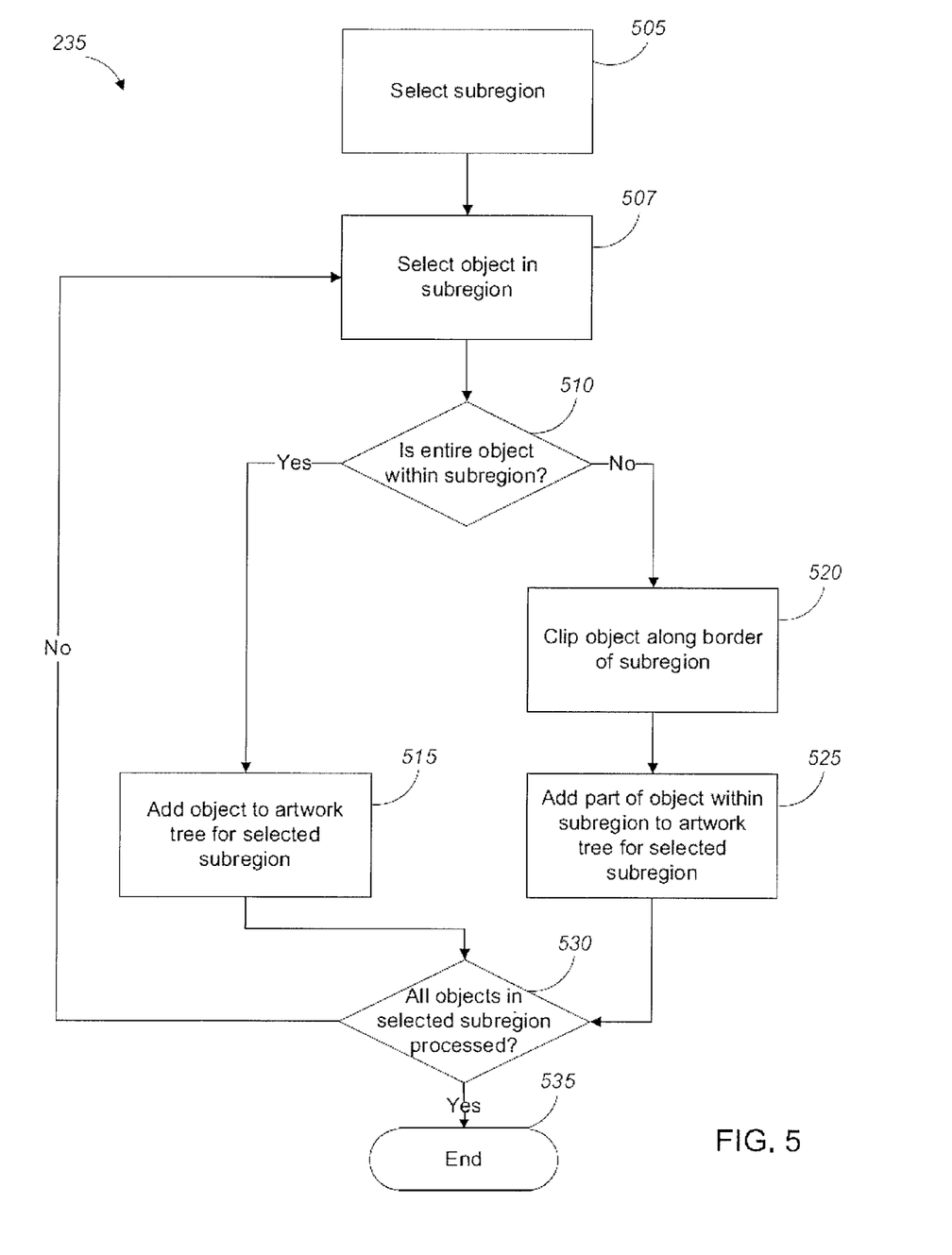
FIG. 5 is a flowchart showing a process for generating an opaque representation of a subregion of an electronic document page.

One method for processing a subregion to generate a set of opaque object components is shown in FIG. 5. A subregion is first selected (step 505) and an object within the subregion is selected (step 507). The process then examines if the entire object is located within the subregion (step 510). If the entire object is located within the subregion, the object is added to the artwork tree for the selected subregion (step 515), and the process examines if there are any more objects to process within the subregion (step 530). However, if it is determined in step 510, that only a part of an object lies within the selected subregion, the object is clipped along the border of the subregion (step 520). This clipped part of the object is then added to the artwork tree for the selected subregion (step 525), and the process examines if there are any more objects to process within the subregion (step 530). If it is determined in step 530 that all the objects within the selected subregion have been processed, the process ends for the selected subregion (step 535). If there are more objects within the selected subregion, the process returns to step 505, where a new object in the subregion is selected and this new object is examined as described above. The result of the processing is an artwork tree for each subregion that excludes all objects lying completely outside the subregion and includes only the relevant portion of objects lying partially inside the subregion. Such an artwork tree is typically much smaller than a conventional artwork tree for flattening that represents an entire page. Moreover, in general, the objects in this artwork tree have much smaller boundaries. This leads to smaller polygonal representations, as well as fewer opaque components.

Returning now to FIG. 2, based on the content of the artwork tree for the subregion, a representation for the subregion is generated and sent to the printer as data to be printed as a hardcopy or to an output file (step 240).

Figure 3:
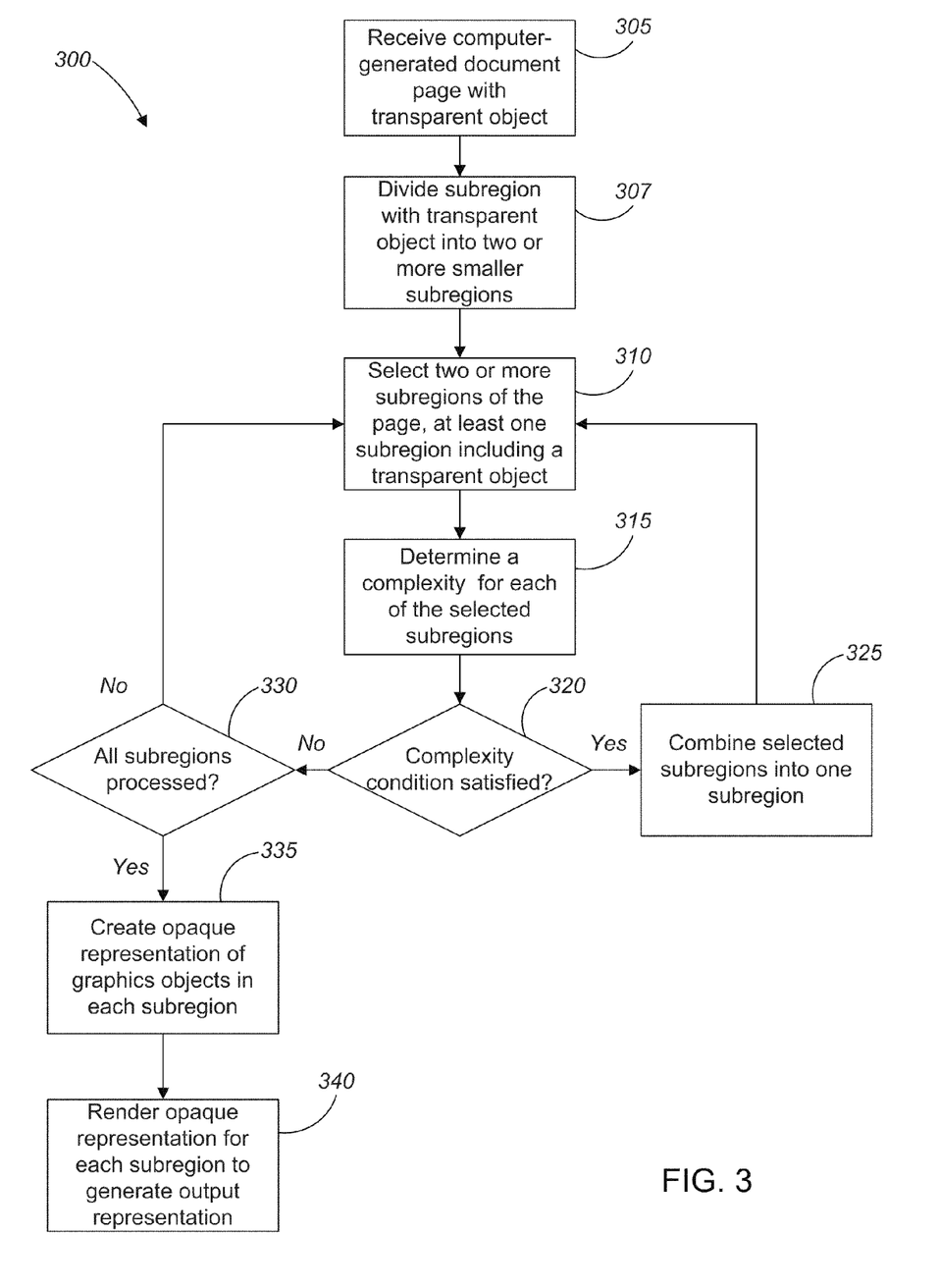
FIG. 3 is a flowchart showing a different implementation of a process for rendering an electronic document page with one or more transparent objects.

FIG. 3 shows a slightly different implementation of the invention compared to the implementation shown in FIG. 2. However, the majority of the process steps 305-340 for the process (300) shown in FIG. 3 are identical to the process steps 205-240 in process (200) shown in FIG. 2 and discussed above, so only the differences will now be described. While the process (200) in FIG. 2 can be described as implementing a "top-to-bottom" approach, the process (300) in FIG. 3 can be characterized as implementing a "bottom-to-top" approach, as will be seen below.

As can be seen in FIG. 3, the process (300) contains an additional step 307 compared to the process (200) in FIG. 2. In step 307, the process divides the subregion with the transparent object into a number of smaller regions before computing a complexity value for the regions. These smaller regions are then used throughout the rest of the process.

Step 310 differs from step 210 in that two or more adjacent regions are selected (as opposed to a single subregion in step 210). The regions are selected such that at least one of the two regions includes a transparent object.

Step 315 is performed in the same manner as step 215, which was described above with reference to FIG. 4, but with the difference that a separate complexity is determined for each of the selected regions. Complexities can be determined for the selected regions sequentially or in parallel.

In step 320 the complexities for the selected regions are combined and used in determining whether the complexity condition is satisfied (as opposed to individual complexities, as was described above for process step 220 in FIG. 2). If complexity values are used in this determination, as described above, and the sum of the complexity values for the selected regions is less than the threshold value, the selected regions are combined into a "super subregion" in step 325, in contrast to step 225 of FIG. 2, where the regions were subdivided if the complexity exceeded the threshold value. The remaining steps 330-340 of FIG. 3 are the same as steps 230-240 that were discussed above with reference to FIG. 2.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

As shown in FIG. 6 by way of example, a printing device 600 implementing an interpreter for a page description language, such as the PostScript language, includes a microprocessor 602 for executing program instructions (including font instructions) stored on a printer random access memory (RAM) 604 and a printer read-only memory (ROM) 606 and controlling a printer marking engine 608. The RAM 604 is optionally supplemented by a mass storage device such as a hard disk. The essential elements of a computer are a processor for executing instructions and a memory. A computer can generally also receive programs and data from a storage medium such as an internal disk or a removable disk 612. These elements will also be found in a conventional desktop or workstation computer 610 as well as other computers suitable for executing computer programs implementing the methods described here, which can be used in conjunction with any digital print engine or marking engine, display monitor, or other raster output device capable of producing color or gray scale cells on paper, film, display screen, or other output medium.

The invention has been described in terms of particular embodiments. Other embodiments are within the scope of the following claims. For example, the steps of the invention can be performed in a different order and still achieve desirable results. The shape of the subregions can vary. Only some portions of a page can be divided into subregions, while the rest of the page is left untouched. Regions can be divided into a fixed number of subregions (predetermined or user-defined) without the determination of a complexity value.

What is claimed is:

1. A method comprising:
    in an electronic document page including one or more objects, at least part of the electronic document page divided into a plurality of subregions, selecting a subregion;
    for each object in the selected subregion:
        determining whether the entire object is located in the selected subregion, and
            if the entire object is located in the selected subregion, adding the object to an artwork tree for the selected subregion, and
            otherwise, clipping the object along a border of the selected subregion and adding the clipped part of the object located in the selected subregion to the artwork tree for the selected subregion;
    generating a first representation of the selected subregion for rendering, the first representation based on content of the artwork tree for the selected subregion; and
    generating a second representation of another selected subregion for rendering, the second representation based on content of the artwork tree for the other selected subregion.

2. A computer program product, tangibly embodied on a storage device, the computer program product comprising instructions operable to cause a programmable processor to:
    in an electronic document page including one or more objects, at least part of the electronic document page divided into a plurality of subregions, select a subregion;
    for each object in the selected subregion:
        determine whether the entire object is located in the selected subregion, and
            if the entire object is located in the selected subregion, add the object to an artwork tree for the selected subregion, and
            otherwise, clip the object along a border of the selected subregion and add the clipped part of the object located in the selected subregion to the artwork tree for the selected subregion;
    generate a first representation of the selected subregion for rendering, the first representation based on content of the artwork tree for the selected subregion; and
    generate a second representation of another selected subregion for rendering, the second representation based on content of the artwork tree for the other selected subregion.

3. A system comprising:
    in an electronic document page including one or more objects, at least part of the electronic document page divided into a plurality of subregions, means for selecting a subregion;
    for each object in the selected subregion:
        means for determining whether the entire object is located in the selected subregion, and
            if the entire object is located in the selected subregion, means for adding the object to an artwork tree for the selected subregion, and
            otherwise, means for clipping the object along a border of the selected subregion and means for adding the clipped part of the object located in the selected subregion to the artwork tree for the selected subregion;
    means for generating a first representation of the selected subregion for rendering, the first representation based on content of the artwork tree for the selected subregion; and
    means for generating a second representation of another selected subregion for rendering, the second representation based on content of the artwork tree for the other selected subregion.

* * * * *